United States Patent [19]

Kattner

[11] 4,209,794
[45] Jun. 24, 1980

[54] NOZZLE PLATE FOR AN INK RECORDING DEVICE

[75] Inventor: Erich Kattner, Neubiberg, Fed. Rep. of Germany

[73] Assignee: Siemens Aktiengesellschaft, Berlin & Munich, Fed. Rep. of Germany

[21] Appl. No.: 918,647

[22] Filed: Jun. 23, 1978

[30] Foreign Application Priority Data

Jun. 24, 1977 [DE] Fed. Rep. of Germany ....... 2728657

[51] Int. Cl.² ............................................. G01D 15/18
[52] U.S. Cl. ................................................. 346/140 R
[58] Field of Search ............................. 346/75, 140 R

[56] References Cited

U.S. PATENT DOCUMENTS

| 3,683,212 | 8/1972 | Zoltan | 346/140 X |
| 3,708,798 | 1/1973 | Hildenbrand et al. | 346/140 |
| 3,857,049 | 12/1974 | Zoltan | 346/75 X |
| 3,902,083 | 8/1975 | Zoltan | 346/140 X |
| 3,958,255 | 5/1976 | Chiou et al. | 346/140 R |
| 4,007,464 | 2/1977 | Bassous et al. | 346/75 |
| 4,014,029 | 3/1977 | Lane et al. | 346/140 R X |
| 4,112,435 | 9/1978 | Kattner et al. | 346/140 R |

FOREIGN PATENT DOCUMENTS

2543451  3/1977  Fed. Rep. of Germany .

OTHER PUBLICATIONS

H. C. Lee et al., "High-Speed Droplet Generator," IBM Technical Disclosure Bulletin, vol. 15, No. 3, Aug. 1972, p. 909.

A. H. Battison et al., "Moving Coil Ink Jet Print Head," IBM Technical Disclosure Bulletin, vol. 16, No. 6, Nov. 1973, p. 1834.

*Primary Examiner*—George H. Miller, Jr.
*Attorney, Agent, or Firm*—Hill, Van Santen, Steadman, Chiara & Simpson

[57] ABSTRACT

A nozzle plate for a mosaic printing unit, which has a plurality of outlet openings arranged in a mosaic pattern with an ink channel for each outlet opening extending away from the outlet opening in a straight line, characterized by the nozzle plate having a thickness of approximately 100μ and having a plurality of nozzle openings aligned with the outlet openings of the mosaic printer with each nozzle opening being provided with an inlet zone facing the outlet opening of the mosaic printer for centering the recording fluid of the respective ink channels with the nozzle opening and an acceleration zone of a reduced cross-section concentrically arranged to the ink inlet zone so that the ink droplets are expelled from the nozzle openings of the nozzle plate are aligned according to a desired direction of flight. The nozzle opening in the nozzle plate can be formed by concentric cylindrical portions or by a conical bore which has a converging taper extending from the inlet zone to the acceleration zone.

3 Claims, 2 Drawing Figures

NOZZLE PLATE FOR AN INK RECORDING DEVICE

BACKGROUND OF THE INVENTION

1. Field of the Invention

The present invention is directed to a nozzle plate which comprises a plurality of nozzle openings for an ink recording head or mosaic printing unit which has ink channels arranged in a mosaic pattern extending away in straight lines from outlet openings of the head.

2. Prior Art

If one arranges several ink channels inside a recording head for a mosaic ink recording device, it is necessary to seal these ink channels at their outlet point or opening by a nozzle plate. According to the arrangement of the ink channels, this nozzle plate is provided with nozzle openings, which serve to align the ejected ink droplets in accordance with the desired direction of flight. German Offenlegungsschrift No. 2,543,451 discloses an embodiment of a nozzle plate in which the nozzle channels of the plate are cylindrical bores that are arranged parallel to each other as they extend through the nozzle plate. In addition, U.S. Pat. No. 3,683,212 discloses a pulse drop ejector in which each channel is sealed by a jewel which is provided with a thin cylindrical bore. This jewel is a clock or watch jewel bearing, whose inside is hemispherical in order to achieve a stability which is necessary in view of the thin walls.

When nozzle plates of this type having cylindrical bores are used, high overall operating voltages are necessary for the drive elements in order to achieve the speed of flight for the ink droplets which is necessary for a distorsion-free type face. These high operating voltages result from the flow losses in the cylindrical nozzle bores.

SUMMARY OF THE INVENTION

The present invention is directed to providing a nozzle plate for an ink recording device such as a mosaic printing unit, which device or unit in spite of the use of low operating voltages of the drive element in the ink channels, allows a high speed of flight from the ink droplets to be achieved. Furthermore, the nozzle plate of this type is producible in a simple and inexpensive manner.

In accordance with the invention, these tasks are realized in an improvement in a nozzle plate for a mosaic printing unit, which printing unit includes a plurality of outlet openings arranged in a mosaic pattern with an ink channel for each outlet opening extending away from the outlet opening in a straight line, said nozzle plate having a thickness of approximately 100μ and having a nozzle opening aligned with each of the outlet openings of the mosaic printer. The improvement comprises each of the nozzle openings of the nozzle plate being provided with an ink inlet zone facing the outlet opening of the mosaic printer for centering the recording fluid of the respective ink channel with the nozzle opening and an acceleration zone of a reduced cross-section concentrically arranged to the ink inlet zone so that the ink droplets, which are expelled from the nozzle openings of the nozzle plate, are aligned according to the desired direction of flight. While the nozzle openings can be formed by concentric cylindrical passages with the acceleration zone having a smaller diameter than the inlet zone, a preferred embodiment of the nozzle openings has a conical cross-sectional configuration along its axis with the surface of the opening converging inwardly to the reduced cross-section adjacent the outlet point for the recording fluid from the nozzle opening.

By using a nozzle plate having nozzle openings or outlet openings, which have the above described shape, ink droplets are first preliminarily aligned in an advantageous way in the ink inlet zone of each of the nozzle openings which inlet zone has a large diameter. In the smaller bore of the so-called acceleration zone, the ink droplets are accelerated to a high speed of ejection. The direction of flight of the ink droplets is thus improved and the formation of secondary or satellite droplets becomes considerably less frequent. The operating voltage of the piezoelectric tubes, which serve as drive elements for each of the ink channels of the printer, can be reduced due to the small flow loss in the large inlet zone of each of the nozzle openings so that cavitation in the ink can be avoided. Due to the small flow losses, the thickness of the nozzle plate can be increased which increased thickness facilitates the handling of the nozzel plate during assembly and during subsequent removal for either replacement and/or cleaning.

DESCRIPTION OF THE PREFERRED EMBODIMENTS

Figure 1:
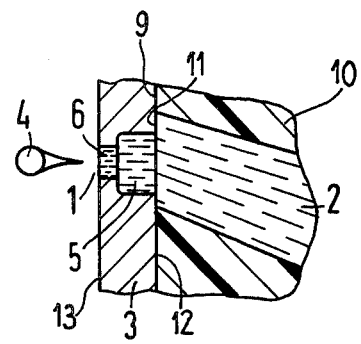
FIG. 1 is a partial cross-sectional view of a nozzle plate in accordance with the present invention.
Figure 2:
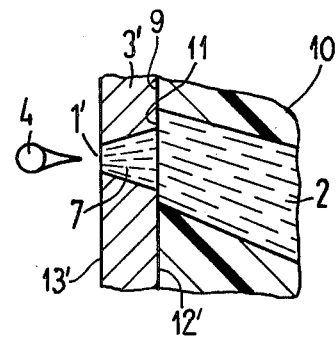
FIG. 2 is a partial cross-sectional view of an embodiment of a nozzle plate in accordance with the present invention.

The principles of the present invention are particularly useful in a nozzle plate 3, which is secured on a surface 9 of a body 10 of a mosaic ink recording device such as described in the German Offenlegungsschrift No. 2,543,451 (whose subject matter is included in co-pending U.S. application Ser. No. 893,614). The mosaic printing device 10 has a plurality of openings 11 which are arranged in a mosaic pattern on the surface 9. Each opening 11 has an ink channel 2 extending inward from the surface 9 in a straight line to a piezoelectric drive element (not illustrated). The nozzle plate 3 has a plurality of nozzle openings 1, with one nozzle opening being aligned with each of the openings 11 so that during operation of the piezoelectric drive element associated with the ink channel 2, a droplet 4 of ink or recording fluid will be ejected from the nozzle 1 in a direction of flight which is determined by the configuration of the nozzle opening 1.

As illustrated in FIG. 1, the present invention is a formation of the nozzle opening 1 with an ink inlet zone 5 adjacent a surface 12 which zone first centers the recording fluid or ink which is being ejected from the channel 2 due to the action of the piezoelectric drive and which opening 1 has an acceleration zone 6 of a reduced cross-section adjacent an outer surface 13 of the plate 3. In the embodiment illustrated in FIG. 1, the nozzle plate 3 has a thickness of approximately 100μ, the ink inlet zone 5 is a cylindrical bore having a diameter of approximately 120μ and the acceleration zone 6 is a cylindrical bore having a diameter of approximately 80μ and an axial length of approximately 20μ. During ejection, the ink fluid is centered within the inlet zone 5, which consists of the cylindrical portion, and is accelerated in the smaller cylindrical bore 6 of the acceleration zone to a high speed of ejection. It should be noted that the axis of the cylindrical bore or passage 6 and the cylindrical portion 5 are concentric and extend substantially perpendicular to the surface 12 of the nozzle plate 3.

Instead of two cylindrical bores having an intermediate shoulder extending therebetween, the nozzle opening 1' of the plate 3' may be formed by a passage 7, which has a conical configuration along its axis. As illustrated, the passage 7 tapers toward an outlet point so that the cross-section converges from surface 12' to the restricted cross-section adjacent the outer surface 13'. The tapering of the passage 7 thus produces a nozzle opening, which has approximately the same design as the nozzle opening 1 in FIG. 1. However, the production of the bore 7 is considerably more simple as no attention must be paid to coaxially aligning the bores forming the zone 5 with the bore forming the zone 6. As in the first embodiment, the ink inlet zone of the bore 7 adjacent surface 12' has a diameter of approximately 120μ and the outlet of the acceleration zone at the outer surface 13' has a diameter of approximately 80μ.

The entire nozzle plate such as 3' can be produced by electroplating the plate on a form provided with protruberances corresponding to the cross-section configuration of the passage 7. Thus, the plate 3' can be made by a method which is simple and inexpensive.

Although various minor modifications may be suggested by those versed in the art, it should be understood that I wish to embody within the scope of the patent warranted hereon, all such modifications as reasonably and properly come within the scope of my contribution to the art.

I claim:

1. In a nozzle plate for a mosaic printing unit, said printing unit having a plurality of outlet openings arranged in the mosaic pattern, an ink channel for each outlet opening extending away from the outlet opening in a straight line, said nozzle plate having a thickness of approximately 100μ and having a plurality of nozzle openings aligned with the outlet openings of the mosaic printer the improvement comprising each of the nozzle openings of the nozzle plate being provided with an ink inlet zone facing the outlet openings of the mosaic printer for centering the recording fluid of the respective ink channel with the nozzle opening and an acceleration zone of a reduced cross-section concentrically arranged to the ink inlet zone so that ink droplets, which are expelled from the nozzle openings of the nozzle plate, are aligned according to the desired direction of flight.

2. In a nozzle plate according to claim 1, wherein each of the nozzle plates of the nozzle openings have a conical cross-sectional configuration along its axis with the surfaces of the opening converging inwardly to the reduced cross section adjacent the outlet point for the recording fluid.

3. In a nozzle plate according to claim 1, wherein each of the inlet zones and the acceleration zones are cylindrical passages which are concentrically arranged relative to each other.

* * * * *